W. H. KILBOURN.
FAUCET.
APPLICATION FILED JAN. 30, 1908.
904,134.
Patented Nov. 17, 1908.
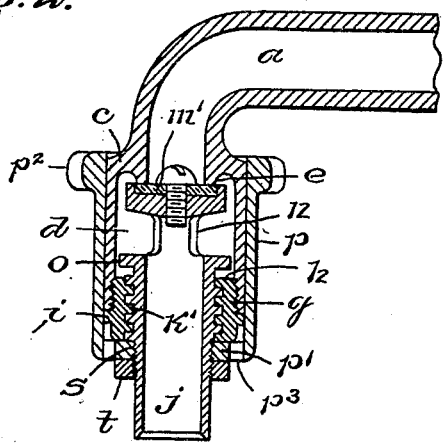
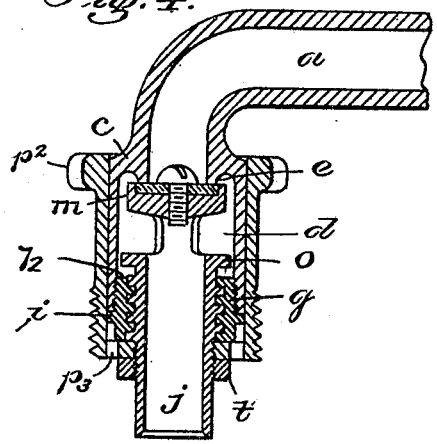
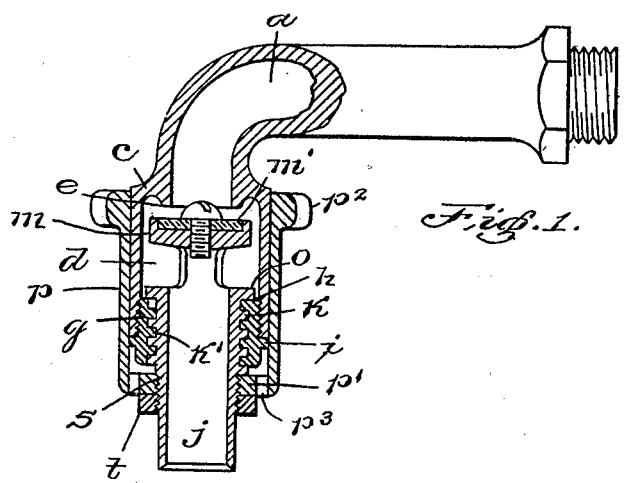
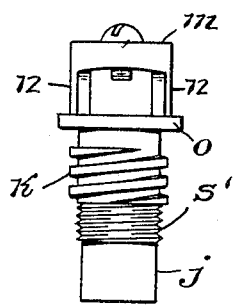
Witnesses:
P. W. Pezzetti
E. Batchelder
Inventor:
W. H. Kilbourn
by Wright, Brown, Quinby & May
Attorneys
THE NORRIS PETERS CO., WASHINGTON, D. C.

UNITED STATES PATENT OFFICE.

WASHINGTON H. KILBOURN, OF GREENFIELD, MASSACHUSETTS, ASSIGNOR OF ONE-HALF TO CHARLES J. DAY, OF GREENFIELD, MASSACHUSETTS.

FAUCET.

No. 904,134.  Specification of Letters Patent.  Patented Nov. 17, 1908.

Application filed January 30, 1908. Serial No. 413,380.

*To all whom it may concern:*

Be it known that I, WASHINGTON H. KILBOURN, of Greenfield, in the county of Franklin and State of Massachusetts, have invented certain new and useful Improvements in Faucets, of which the following is a specification.

This invention has for its object to provide a simple, durable and inexpensive faucet, adapted to be tightly closed against leakage without the use of complicated and expensive packing devices, and in which escape of water resulting from any leakage that may occur, will be confined wholly to the outlet nozzle, and will drip therefrom without escaping from any other part of the faucet.

The invention consists in the improvements which I will now proceed to describe and claim.

Of the accompanying drawings, forming a part of this specification,—Figure 1 represents a sectional view showing my improved faucet, the valve being open. Fig. 2 represents a view similar to Fig. 1, the valve being closed. Fig. 3 represents a side view of the outlet nozzle. Fig. 4 represents a view similar to Fig. 1, showing means for engaging a filter or hose device with the faucet.

The same letters of reference indicate the same parts in all the figures.

The casing of my improved faucet comprises an inlet portion or passage $a$, and an enlargement $c$ formed upon the delivering end of the inlet passage, said enlargement being hollow, and forming a valve chamber $d$ of greater diameter than the inlet passage. The inlet passage projects into the chamber $d$, and forms an annular valve seat $e$. The valve chamber $c$ has an internal screw thread at its mouth or lower end, with which is engaged an external screw thread on a sleeve or bushing $g$. The said bushing is preferably provided with an outwardly projecting shoulder $i$, which, when the bushing is screwed to place in the valve chamber $c$, abuts against the end of the chamber, and prevents leakage through the crevice between the chamber and the bushing. The bore of the bushing $g$ is in alinement with the valve seat.

$j$ represents an outlet nozzle, which has an external screw thread $k$ engaging an internal thread $k'$ formed in the bushing $g$, so that rotation of the nozzle $j$ causes it to move endwise in the bushing. The nozzle $j$ is provided at its inner end with a valve $m$, which is formed to bear upon the valve seat $e$, and close the latter. The valve $m$ is connected with the body of the nozzle $j$ by bars $n$, between which are ports for the passage of water from the chamber $d$ to the outlet nozzle.

$p$ represents an annular sleeve having a base portion $p'$ which is secured to the outlet nozzle $j$, preferably by an internal thread $s$ formed in said base portion, and an external thread $s'$ on the nozzle, the sleeve projecting upwardly from the said base portion, and surrounding the valve chamber $c$. The sleeve is adapted to be grasped by a thumb and finger, and rotated for the purpose of opening and closing the valve. The extended surface of the sleeve may be milled or corrugated to present a suitable engaging surface. It is here shown as provided with a corrugated enlargement $p^2$ at its upper end.

It will be seen that the joint formed by the internal thread of the bushing $g$ and the external thread of the outlet nozzle $j$, extends downwardly from the valve chamber, so that any water which may leak through said joint, when the valve $m$ is open, must flow downwardly along the exposed external surface of the nozzle $j$. Such leakage will drop from the lower end thereof with the water flowing through the nozzle, and will therefore be entirely unobjectionable. The base portion $p'$ of the annular sleeve $p$ may have drainage orifices $p^3$ for the downward escape of any water which may leak between the screw threads $k$ and $k'$. Said orifices $p^3$ also permit air to pass upwardly between the inner surface of the sleeve $p$ and the parts surrounded by said sleeve to keep the sleeve reasonably cool when the faucet is used to supply hot water.

The valve is provided with a disk or washer $m'$ of compressible material, which is surrounded by the wall of a countersunk orifice formed in the metal body of the valve, so that the said wall protects the margin of the compressible washer, and prevents it from being distorted, thus greatly prolonging its usefulness.

$t$ represents a lock nut which is screwed upon the lower screw thread $s'$ of the nozzle to prevent the annular handle $p$ from being unscrewed from the nozzle.

The inner end of the bushing $g$ is preferably flat, and forms an annular seat $h$.

The outlet nozzle $j$ is preferably provided with an outwardly projecting annular flange or shoulder $o$, the under face of which is adapted to be seated upon the annular seat $h$. The arrangement of the valve $m$ and flange $o$ is such that when the valve $m$ is open, as shown in Fig. 1, the flange $o$ is closed upon the seat $h$, thus preventing leakage between the sleeve $g$ and the outlet nozzle $j$. When the valve $m$ is closed, as shown in Fig. 2, the flange $o$ is raised from its seat.

It will be seen that provision is made for preventing leakage of the faucet, both when the valve is open and when it is closed. The flange $o$ and seat $h$, together with the shoulder $i$ on the sleeve $g$, bearing against the end of the valve chamber $c$, prevent any considerable leakage when the valve is open. The valve $m$, when closed, excludes water from the chamber $d$.

The internally threaded bushing $g$ detachably connected with the valve chamber permits the employment of a valve which is of considerably greater diameter than the outlet nozzle, and a valve chamber of correspondingly large diameter, the outlet nozzle and its valve being applied to and removed from the valve chamber with the bushing.

I claim:

1. A faucet comprising a valve chamber having an inlet passage and an internally threaded bushing detachably connected with the chamber, and an externally threaded nozzle engaged with the bushing and carrying a valve, the screw threads of the nozzle and bushing forming a joint adapted to conduct leakage downwardly from the chamber to the discharge end of the faucet.

2. A faucet comprising an inlet passage, a valve chamber at one end of the inlet passage, a valve seat at the inlet side of the chamber, an internally threaded bushing detachably secured to the chamber, its inner end forming a flange seat within the chamber, and an outlet nozzle externally threaded to engage the internal thread of the bushing, and provided with a valve to coöperate with the valve seat, an annular flange to coöperate with the flange seat and intermediate ports or passages, the outlet passage and nozzle forming a joint adapted to conduct leakage downwardly from the chamber.

3. A faucet comprising an inlet passage, a valve chamber at the delivering end of the inlet, a valve seat at one end of the chamber, a bushing having an external thread engaged with an internal thread in the chamber, said bushing being internally screw threaded, and provided with a flange seat within the chamber and with an external shoulder abutting against the outer end of the chamber, and an outlet nozzle externally threaded to engage the internal thread of the bushing, and provided with a valve, an annular flange adapted to bear on said flange seat and intermediate ports between the valve and flange.

4. A faucet comprising an inlet passage, a valve chamber at one end of the inlet passage, a valve seat at the inlet side of the chamber, an internally threaded bushing detachably secured to the chamber, its inner end forming a flange seat within the chamber, an outlet nozzle externally threaded to engage the internal thread of the bushing, said nozzle being provided with a valve, an annular flange adapted to bear on said flange seat, and intermediate ports or passages, and an annular casing formed to surround the chamber, and having a base portion affixed to the outlet nozzle.

In testimony whereof I have affixed my signature, in presence of two witnesses.

WASHINGTON H. KILBOURN.

Witnesses:
M. L. MATHISON,
P. W. PEZZETTI.